United States Patent [19]

Seidel

[11] 4,081,692
[45] Mar. 28, 1978

[54] APPARATUS FOR SUPPLEMENTING COMMERCIAL POWER SUBJECT TO BROWNOUT AND BLACKOUT FAILURES

[75] Inventor: Harold Seidel, Warren, N.J.

[73] Assignee: Bell Telephone Laboratories, Incorporated, Murray Hill, N.J.

[21] Appl. No.: 740,314

[22] Filed: Nov. 9, 1976

[51] Int. Cl.² ............................................. H02J 9/00
[52] U.S. Cl. ...................................... 307/64; 307/77; 323/111
[58] Field of Search ..................... 307/51, 64, 56, 43, 307/18, 21, 22, 23, 87, 25, 19, 44, 46, 68, 70, 77, 78, 80, 153; 323/45, 111, 112, 114, 115

[56] References Cited
U.S. PATENT DOCUMENTS 2,783,393  2/1957  Lindahl et al. ......................... 307/64
4,038,559  7/1977  Chun et al. ............................. 307/51

Primary Examiner—Robert K. Schaefer
Assistant Examiner—Morris Ginsburg
Attorney, Agent, or Firm—Henry T. Brendzel

[57] ABSTRACT

A power source for supplementing commercial ac power in cases of sustained brownouts or blackouts is achieved with an alternator connected to augment the power of a commercial ac source, a first circuit for sensing the voltage level required of the alternator and for controlling the field drive of the alternator to produce the required voltage level, a second circuit for determining the frequency and phase of the voltage generated by the alternator, and apparatus for driving the alternator at the angular frequency and spatial angle dictated by the second circuit.

20 Claims, 6 Drawing Figures

APPARATUS FOR SUPPLEMENTING COMMERCIAL POWER SUBJECT TO BROWNOUT AND BLACKOUT FAILURES

BACKGROUND OF THE INVENTION

1. Field of the Invention

This invention relates to systems for generating electrical power and, more particularly, to systems for locally generating electrical power to augment incoming power having sustained periods of low level.

2. Description of the Prior Art

A substantial portion of modern-day technology depends for its operating power on commercially supplied ac power sources. Sometimes, however, a commercial ac power source fails catastrophically, resulting in blackouts, or fails only partially, resulting in brownouts or transients. A blackout is a condition of absolute power failure. A brownout is a condition of significantly reduced output voltage. A transient is a momentary surge or dip in the power level due to substantial but short disturbances at the generating equipment or on the power line.

Power level variations as described above can significantly affect equipment and may, in some instances, damage the equipment. In communication circuitry, even a transient interruption or surge may cause undetected errors in data or control signals or cause damage that is not readily detectable or obvious. To protect against those hazards, uninterruptable power supplies (UPS) are often employed. A UPS guarantees the continuity of power regardless of the performance of the primary commercial ac power source upon which the customer generally relies.

A commonly used UPS is the continuous type power supply in which a rectifier charger, powered by a primary commercial ac power source, continuously energizes an inverter circuit. The inverter circuit operates to supply output power. A battery is connected across the output of the rectifier charger to supply the necessary dc power to the inverter, should the primary commercial ac power source vary significantly or fail.

Another type of UPS operates in a parallel continuous arrangement in which two independent sources, a primary commercial ac power source and a secondary reserve ac power source, operate continuously in parallel. These two ac signals are combined and supplied to the load continuously. Should one fail, the remaining operative source takes over to supply the partial or the full load, as necessary. An example of this type of UPS is disclosed by R. E. Kuba in U.S. Pat. No. 3,398,292, issued Aug. 20, 1968.

Still another type of UPS is the transfer type. In the transfer type UPS the full power to the load is normally supplied by the commercial ac source. When the commercial power source is operating normally, the reserve power supply does not supply any power to the load but operates in a standby mode. When the ac commercial power fails, the auxiliary power, which generally comprises a dc source connected to an inverter, is connected to supply the power to the load and the commercial ac power source is disconnected from the load. Transfer type UPS systems are disclosed, for example, by R. Schumacher et al. in U.S. Pat. No. 3,229,111, issued Jan. 11, 1966, and by R. S. Jamieson in U.S. Pat. No. 3,348,060, issued Oct. 17, 1967.

The above solutions to degradations in power levels supplied by commercial ac sources are quite effective as long as the degradations are not of sustained duration. They are not effective for sustained blackouts or brownouts because the auxiliary power in all of the above arrangements is a battery that is being discharged in the process of replacing or supplementing the commercial power. Blackouts and brownouts, on the other hand, are generally sustained failures. Blackouts generally occur when a system fault occurs which needs to be repaired, and brownouts generally occur when the generating equipment is already operating at a peak of capacity when additional power is demanded by the users, or when the power company, for whatever reasons, needs to conserve existing fuel supplies.

To ameliorate the effects of a sustained brownout, customers can increase the voltage supplied to them locally by employing a step-up transformer. This, however, is not a viable solution, for it attempts to extract additional power from an already exhausted power source. It remains, then, that in situations of sustained brownouts, required power which cannot be supplied by the commercial power source must be obtained from a plentiful and stable auxiliary power source supplied by each customer.

In view of the foregoing, it is an object of this invention to provide a stable and plentiful auxiliary power source which would reliably and effectively augment the power supplied by commercial ac power sources in cases of sustained failures.

SUMMARY OF THE INVENTION

This and other objects of the invention are achieved with an alternator connected to augment the power of a commercial ac source, a first circuit for sensing the voltage level required of the alternator and for controlling the field drive of the alternator, a second circuit for determining the frequency and phase of the voltage generated by the alternator, and apparatus for driving the alternator at the angular frequency and spatial angle dictated by the second circuit.

BRIEF DESCRIPTION OF THE DRAWING

A more thorough understanding of the principles of this invention will be had from the following description combined with the appended drawing, in which.

DETAILED DESCRIPTION

Figure 1:
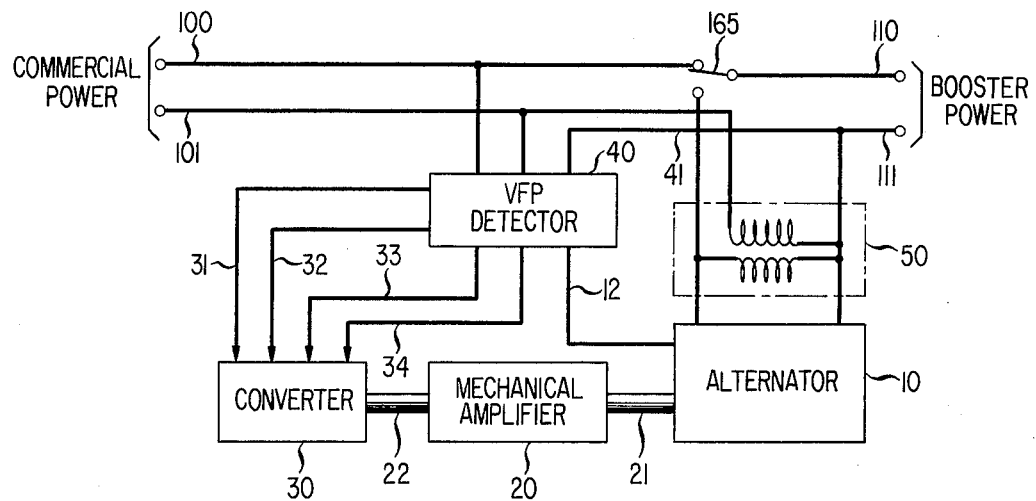
FIG. 1 depicts a block diagram of a power augmenting system embodying the principles of this invention.

In FIG. 1, commercial power is applied to terminals 100-101. Alternator 10 is connected through transformer 50 in series with the commercial power, applying thereby a boosted voltage to terminals 110-111. The boosted voltage is the algebraic sum of the voltage delivered by the commercial power and the transformed voltage developed by alternator 10. Mechanical amplifier 20 drives alternator 10 via shaft 21, providing whatever torque is demanded by shaft 21 in order to supply the necessary auxiliary power to terminals 110-111. The angular frequency and spatial phase of shaft 21 (relative to the phase of the commercial power) is controlled by the angular frequency and spatial phase of shaft 22 which is the input shaft of mechanical amplifier 20. Rotation of shaft 22 is under control of converter 30. Converter 30 obtains information regarding the desired angular frequency and spatial phase of shaft 22 from voltage-frequency-and-phase detector (VFP detector) 40, via leads 31-32 and 33-34, respectively.

Since VFP detector 40 develops a measure of the frequency of the voltage supplied by the commercial source and a measure of the phase difference between the commercial source voltage and the voltage developed by alternator 10, it is made responsive to the voltage provided by the commercial power source (terminals 100-101) and to the voltage developed by alternator 10 (lead 41). As indicated above, the measure of phase difference, which indicates the amount by which alternator 10 is leading or lagging the commercial power source, is applied to converter 30. Also applied to converter 30 is the measure of the commercial source's frequency. The measure of commercial voltage level, through lead 12, is applied to the field drive of alternator 10. The field drive controls the voltage magnitude developed by the alternator.

To obtain a clearer understanding of the principles and advantages of this invention, the overall operation of the FIG. 1 system is described below, followed by a detailed description of each of the elements of FIG. 1.

OVERALL OPERATION

The boosted power, in combination with the commercial power, develops a frequency signal in VFP detector 40 which is representative of the desired angular frequency, $\omega_i$, of shaft 22. Frequency $\omega_i$ corresponds to the frequence of the commercial power ac power source, $f_i$. The developed frequency signal is transmitted to converter 30 via leads 31-32 whereby shaft 22 is caused to rotate at $\omega_i$. The rotation of shaft 22 is translated in mechanical amplifier 20 to shaft 21, causing it to rotate at angular frequency $\omega_1$. Rotation of shaft 21 at angular frequency $\omega_1$ causes alternator 10 to develop a voltage having the frequency $f_i$. In this manner, frequency integrity is established between the primary commercial power source and the auxiliary source of alternator 10.

It is, of course, unlikely that the phase of the voltage developed by alternator 10 would, on its own, coincide with the phase of the voltage delivered by the commercial power source. To insure this coincidence, which is necessary for efficient algebraic summation of the two voltages, a phase feedback signal is developed in VFP detector 40 to control the spatial phase of shaft 22 with respect to the phase angle of the commercial power source. The spatial phase of shaft 22 is translated in mechanical amplifier 20 to shaft 21. The phase feedback signal developed in detector 40 is applied to converter 30 via leads 33-34. Phase control of shaft 22 is achieved in converter 30 by momentarily slowing down or speeding up of shaft 22 as is described hereinafter.

To obtain the proper output voltage, control lead 12 directs alternator 10 to develop a voltage of such magnitude that when translated by transformer 50, the developed voltage is sufficient to boost the power level at terminals 110-111 to a desired preselected level.

DETAILED DESCRIPTION OF BLOCK DIAGRAM ELEMENTS

TRANSFORMER 50

Transformer 50 is included in the system of FIG. 1 only for the purpose of matching the loading on alternator 10 to the power required therefrom. That is, given a particular power required of alternator 10, it is generally more efficient and more economical to operate the alternator close to its optimum operating voltage and to step-down or step-up the developed voltage, as required, with a transformer. For example, if it is expected that a 110 volt commercial power source fails only in a brownout mode and degrades during brownouts by 15 volts, and if 150 volt operation is the most efficient operating voltage for alternator 10, then the use of transformer 50 having a 10 to 1 turns ratio 1 in order. Use of transformer 50 is still appropriate even when blackout failures are expected, because a switching arrangement may be employed to bypass the transformer when a blackout failure occurs. The failure detection circuitry is not shown in FIG. 1, but the switch used, switch 165, is shown in FIG. 1 because its location is important. Since a blackout failure may be caused by either a short circuit or an open circuit at the commercial source (with an open circuit being more likely), and since a voltage potential should not be applied across terminals 100-101 when a blackout failure occurs (hazardous to repair personnel), switch 165 is arranged to break the circuit connection between terminals 100 and 110 and connect alternator 10 directly to terminal 110. In this manner, the full voltage of alternator 10 is applied to terminals 110-111.

MECHANICAL AMPLIFIER 20

Figure 2:
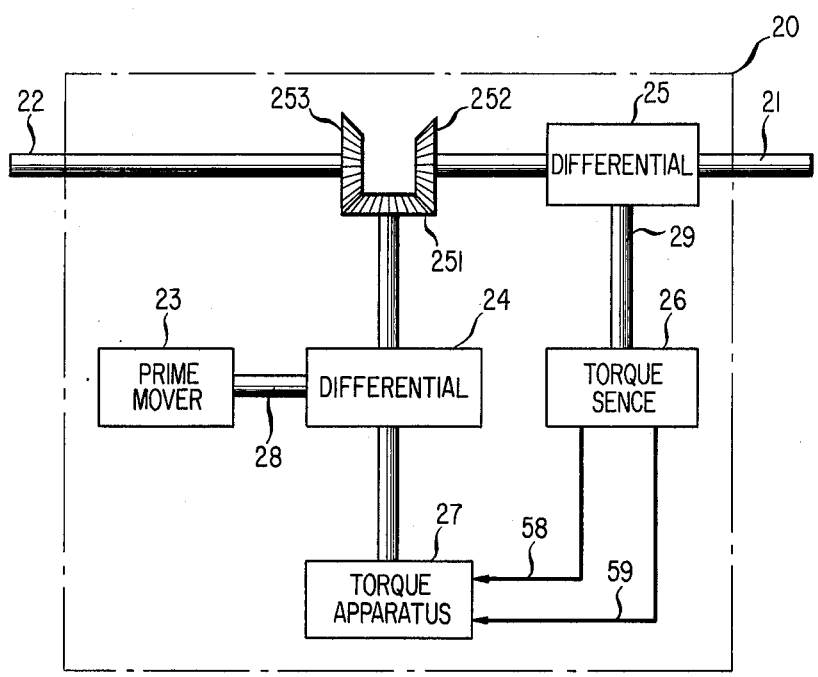
FIG. 2 illustrates the details of mechanical amplifier 20.

Mechanical amplifier 20 is disclosed in U.S. Pat. No. 3,405,570, issued to me on Oct. 15, 1968. Another good description of amplifier 20 is found in "Frequency Relations of Parametric Interactions" by H. Seidel, IEEE Spectrum, Vol. 3, No. 7, July 1966, pp. 93-105. For convenience, a block diagram of amplifier 20 is shown in FIG. 2 and a description thereof follows.

The "power supply" of mechanical amplifier 20 is prime mover 23. It is an apparatus for rotating a shaft 28 and may, for example, be a diesel engine. The only requirement imposed on prime mover 23 is that it be able to supply all the necessary power required of alternator 10 and that it rotate at an angular frequency $\omega_h$ which is greater than a predetermined fraction of the angular frequency $\omega_i$.

Shaft 28 of prime mover 23 is connected to a first terminal of a three terminal mechanical differential 24. Differential 24, such as a car differential which drives the two back wheels of the car, is a symmetrical three terminal parametric device obeying the relationship $(P_1/\omega_1) = (P_2/\omega_2) = (P_3/\omega_3)$ where $P_i$ is the power delivered at the $i^{th}$ terminal of the differential and $\omega_i$ is the angular frequency of the $i^{th}$ terminal. From the above, it is shown in the above referenced IEEE Spectrum article that $\omega_1 + \omega_2 + \omega_3 =$ , that $P_1 + P_2 + P_3 = 0$ and that $T_1 = T_2 = T_3$, where $T_i$ is the torque at the $i^{th}$ terminal. Getting back to FIG. 2, a second terminal of differential 24 is connected to gear 251 which is part of a gear arrangement comprising gears 251, 252, and 253. Gears 251, 252 and 253 are shown in FIG. 2 as bevel gears to more clearly illustrate their interaction. It is understood, of course, that many other gear arrangements are possible.

Gear 253 is connected to the input control shaft of mechanical amplifier 20 (shaft 22), and gear 252, driven by the arrangement of gears 251 and 253, is connected to a first terminal of mechanical differential 25. A second terminal of differential 25 is connected to shaft 21, which is the output shaft of mechanical amplifier 20. The third, and remaining terminal of differential 25 is connected to torque sense apparatus 26 via shaft 29. Apparatus 26 keeps shaft 29 stationary, causing the full rotational speed of the first terminal of differential 25, i.e., of gear 252, to be transmitted to the second terminal of differential 25, i.e., shaft 21. In addition to keeping shaft 29 stationary, apparatus 26 measures the torque applied to shaft 21 by measuring the torque applied to shaft 29.

Figure 5:
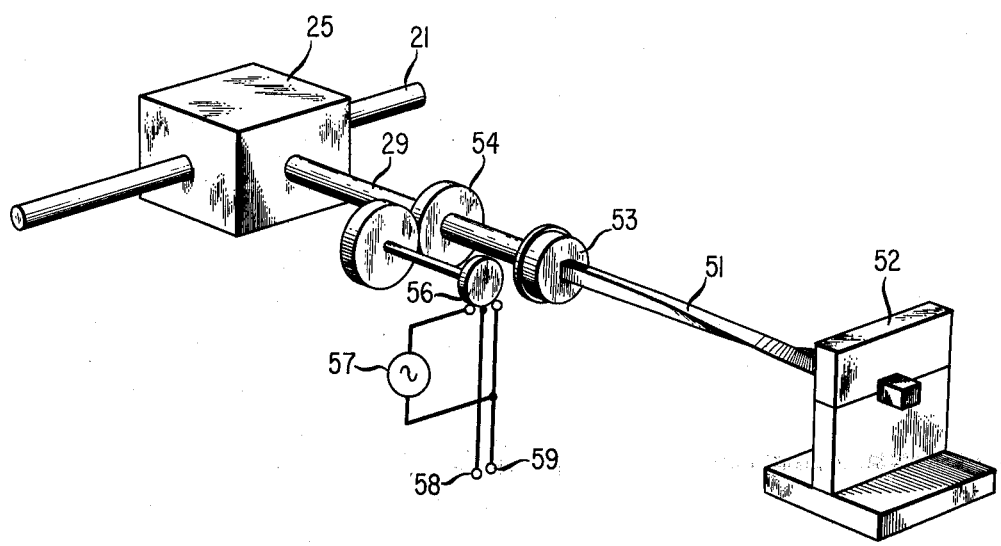
FIG. 5 depicts one arrangement for stalling a shaft and measuring the torque applied thereto.

Torque sense apparatus 26 may have many forms. One such form may comprise an elastic bar connected to shaft 29 and electrical means for sensing the twisting movement, or rotation, of the elastic bar. A pictorial representation of one such arrangement is depicted in FIG. 5, where elastic bar 51 is connected with coupler 53 between shaft 29 and stationary block 52. Also connected to shaft 29 is gear arrangement 54 which couples the rotational movement of shaft 29 to potentiometer 56 which, in turn, gives an electrical indication of the shaft's movement by way of its connection to voltage source 57. The greater the torque provided by differential 25, the greater the rotation of elastic bar 51 and the larger the electrical signal developed by potentiometer 56 across leads 58 and 59. Thus, torque sense apparatus 26 develops a voltage that is directly proportional to the torque developed by differential 25.

The output signal of torque sense circuit 26 (leads 58 and 59) is applied to torque apparatus 27. Apparatus 27, is connected to the third and remaining terminal of differential 24, and presents a torque thereto in proportion to the output signal of circuit 26. Apparatus 27 may be a loaded dc generator whose field winding is responsive to the output signal of circuit 26 and whose armature winding is driven by a constant current source. In accordance with the principles of this invention, apparatus 27 is arranged to develop a torque that is only slightly smaller than the torque sensed by torque sense circuit 26. To designate it mathematically, if the torque applied to shaft 21 (and sensed by circuit 26) is T, then the torque developed by apparatus 27 is arranged to equal T-$\delta$, where $\delta$ is preselectedly small. The reduction in torque, $\delta$, may be arbitrarily small, may be a constant or may be a fixed fraction of T. It must, in any event, be positive.

The steady state torque conditions present in amplifier 20 are as follows. The torque demanded of (and delivered to) shaft 21 is T, the torque sensed by circuit 26 is T, the torque supplied by motor 27 is T-$\delta$, and, therefore, the torque delivered by prime mover 23 to gear 251 is T-$\delta$. Since the torque at shaft 21 is T, the torque at gear 252 must also be T. Since the torque supplied by gear 251, is T-$\delta$, it remains that a torque of magnitude $\delta$ must be supplied by shaft 22. In other words, by delivering a torque $\delta$ to shaft 22, a torque T is delivered to gear 252 and to shaft 21.

The above analysis was made for a 1:1:1 gear ratio in the gear arrangement of gears 251-253 and for a prime mover having an angular frequency $\omega_h$ which is greater than $\omega_i$. The angular frequency requirement of $\omega_i$ can clearly be seen from the differential relationship $\omega_1 = \omega_2 = \omega_3$. When prime mover 23 is the source of power, the highest angular frequency attainable by gear 251 is $\omega_h$. This occurs when apparatus 27 is stationary. All other possible angular frequencies of gear 251 are lower than $\omega_h$ (if torque apparatus 27 is not permitted to deliver power to differential 24). Therefore, to obtain an angular frequency of $\omega_i$, $\omega_h$ must be equal or greater than $\omega_1$. Other gear ratios for gears 251-253 are, of course, possible, as long as the angular frequency of prime mover 23, as translated to gear 252, is still equal to or greater than $\omega_i$.

From the foregoing description of the construction, operation and steady state conditions of mechanical amplifier 20, it can be seen that amplifier 20 faithfully transmits to shaft 21 the rotational speed and position of shaft 22, that only a torque of value $\delta$ is required to be applied to shaft 22, that any torque T can be delivered to shaft 21 as long as prime mover 23 can supply that torque, and that the value of $\delta$ can be made, by design, arbitrarily small.

CONVERTER 30

Figure 3:
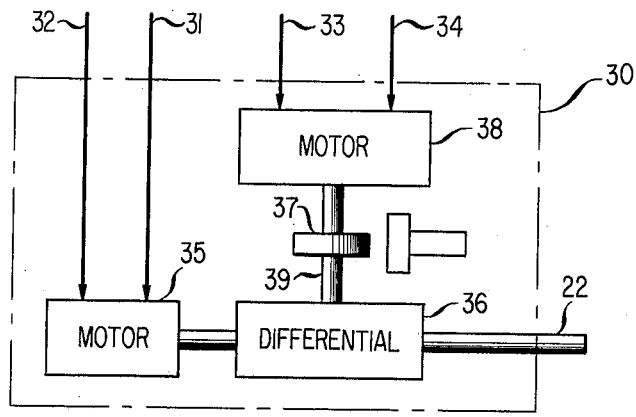
FIG. 3 illustrates the details of converter 30.

Converter 30 rotates shaft 22 at an angular frequency $\omega_i$. This is accomplished, as shown in FIG. 3, with synchronous motor 35 connected to the signal provided by VFP detector 40 on leads 31-32. The shaft rotation of motor 35 is translated to shaft 22 through mechanical differential 36. That is, motor 35 is connected to a first terminal of differential 36 and shaft 22 is connected to a second terminal of differential 36. The third terminal of differential 36 is connected, through shaft 39, to dc motor 38. Coupled to shaft 39 is a mechanical brake 37 which holds shaft 39 stationary when motor 38 is inactive. This permits shaft 22 to rotate at the rotational speed of motor 35. Motor 38 is responsive to signals supplied by VFP detector 40 on leads 33-34. When the phase difference between the commercial power source and alternator 10 is positive, lead 33 is positive with respect to lead 34 and motor 38 rotates shaft 39 in one direction. When the phase is negative, the reverse is true with respect to leads 33-34 and motor 38 rotates shaft 39 in the opposite direction. As employed herein, when the phase angle is positive, the commercial power leads the generated power. To bring the two voltages into alignment, the direction of rotation imparted to shaft 39 by motor 38 is selected so as to momentarily increase the rotational speed of shaft 22. In this manner, the phase angle of alternator 10 is advanced.

DETECTOR 40

Voltage-frequency-phase detector 40 has three relatively independent functions: to detect the voltage level of the incoming commercial power, to detect the frequency of the incoming commercial power, and to detect the phase difference between the commercial power and the voltage developed by alternator 10. The voltage may be measured with a commercial voltmeter, the frequency may be measured with a commercial counter and the phase difference may be measured with a commercial phase meter.

Figure 4:
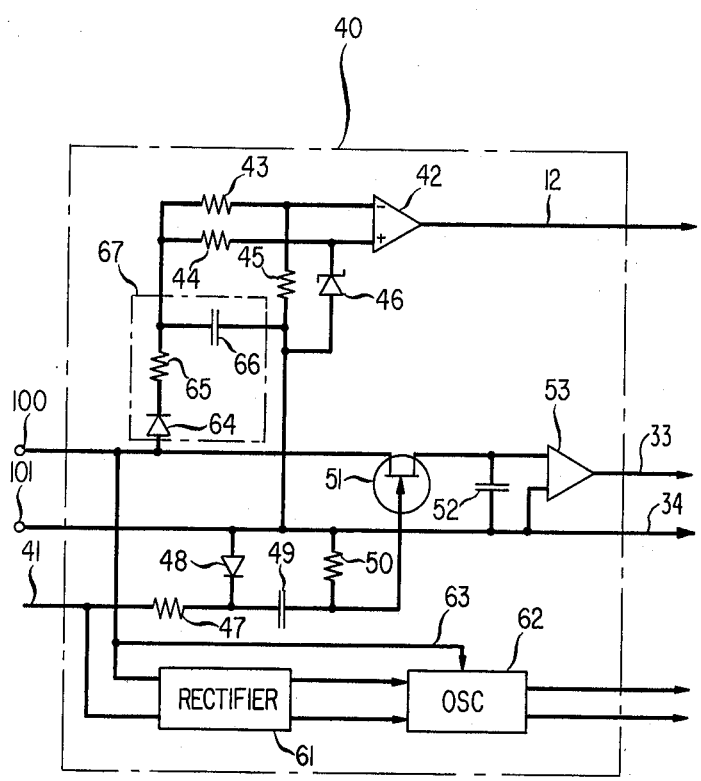
FIG. 4 presents one embodiment of voltage-frequency-and-phase detector 40.

A less expensive embodiment of detector 40 is shown in FIG. 4. The voltage detector portion in FIG. 4 comprises rectifier network 67, amplifier 42, resistors 43 through 45, and zener diode 46. Network 67 comprises diode 64, resistor 65 and capacitor 66 arranged to rectify the incoming signal on terminals 100-101 and to develop a signal proportional to the RMS value of its input signal. Resistors 43 and 45 are arranged to extract a fraction of the signal developed by network 67 and to apply that fraction to the negative input of amplifier 42. Resistor 44 and zener diode 46 are coupled to the signal developed by network 67 and are arranged to develop a constant voltage across diode 46 representative of the desired RMS voltage level at terminals 110-111. That constant voltage is applied to the positive input of amplifier 42. Thus interconnected, whenever the applied commercial power falls below the desired RMS level, amplifier 42 develops a positive signal proportional to the difference between the desired boosted power voltage and the commercial power voltage. This signal, via lead 12, is applied to the field drive of alternator 10 to control output voltage level of the alternator.

The phase detection section of FIG. 4 samples the voltage level of the applied commercial power at the zero crossing of the voltage developed by alternator 10. The sensed voltage represents the angle difference between the two voltage waveforms. Strictly speaking, the value of the sampled voltage represents the sine of the phase angle difference. However, the expected phase angle difference is close to zero, and therefore the deviations will, most likely, represent small angles. At small angles, the sine is very nearly equal to the angle itself.

In the sampler embodiment depicted in FIG. 4, resistor 47 and diode 48 are connected to truncate and "square up" the voltage developed by alternator 10 (between terminal 101 and lead 41), capacitor 49 and resistor 50 are connected to differentiate the "squared up" voltage developed by diode 48 (obtaining thereby a sampling pulse situated at the zero crossing of the voltage developed by alternator 10) and field effect transistor 51 is arranged with capacitor 52 to sample and hold the level of the commercial power appearing on terminal 100 in response to the sampling pulses of resistor 50. The voltage across capacitor 52 is enhanced in amplifier 53 and applied through leads 33-34 to control motor 38 in converter 30.

The frequency detection section of FIG. 4 comprises rectifier 61 and oscillator 62. Rectifier 61 develops a dc supply signal and may comprise a simple rectifier or even a regulated power supply. Rectifier 61 develops its output signal from the boosted power rather than from the commercial power so that a blackout failure will not diminish its output level. The output voltage of rectifier 61 is applied to oscillator 62. Oscillator 62 is a self-oscillating circuit adapted to receive a synchronizing signal on lead 63. The signal on lead 63 causes oscillator 62 to oscillate at a frequency equal to the frequency of the synchronizing signal. Since lead 63 is connected to terminal 100, oscillator 62 develops an output voltage on leads 31-32 having the frequency $f_i$.

Oscillator 62 may be constructed in accordance with the teachings of *Pulse Digital and Switching Waveforms*, Millman and Taub, McGraw-Hill 1965, Chapter 19. Most commonly, in order to achieve a synchronization capability in an oscillator, the self induced oscillations must be at a frequency $f_x$ that is lower than the frequency $f_i$. For purposes of this invention, the self oscillation frequency $f_x$ of oscillator 62 should be selected as close as practical to the expected lowest value of the frequency $f_i$. In cases of a blackout failure, the synchronizing signal disappears and oscillator 62 becomes "free-running," oscillating at frequency $f_x$. Oscillator 62 need not be capable of supplying large amounts of power. As illustrated in FIG. 3, the signal on leads 31-32 drives motor 35 which is a synchronous motor delivering a torque $\delta$ to shaft 22. The torque $\delta$ is very small and, therefore, motor 35 is a small synchronous motor (e.g., a squirrel cage motor) requiring a very modest power level from leads 31-32. It should be pointed out that when only brownout failures are expected, rectifier 61 and oscillator 62 are both unnecessary since motor 35 may be driven directly by the commercial power appearing on terminals 100-101.

Summarizing the various salient features of the FIG. 1 system, it is readily observed that there exists a very tight control over the output of alternator 10. Only a small torque $\delta$ is required to be applied to shaft 22, yet the rotational speed of shaft 22 is synchronously reproduced at shaft 21 which drives alternator 10. It can also be observed that mechanical amplifier 22 has very little intertia. Since prime mover 23 is constantly rotating at $\omega_h$, an increase in the rotational speed of alternator 10 requires the acceleration of essentially only the alternator itself. The increase in speed is instantaneously supplied from a reduction in the rotational speed of the shaft of torque apparatus 27. The prime mover need not be accelerated. Such an arrangement provides a high speed of response in the system of FIG. 1.

As for efficiency, the power consumed in elements 30 and 40 is relatively insignificant, alternator 10 can be made to operate at a near optimum operating point (with the aid of transformer 50) and the only significant power loss occurs in mechanical amplifier 20. Specifically, prime mover 23 delivers power $T\omega_h$ while the useful power at gear 251 is $T\omega_i$. The difference, which is the power loss consumed in apparatus 27, is $T(\omega_h-\omega_i)$. This power loss, which is the only power loss in amplifier 20, can be minimized by making $\omega_h$ arbitrarily close to $\omega_i$ or, alternatively, by employing that power for other beneficial purposes. That is, in a dc generator embodiment of apparatus 27 the output voltage developed by the generator may be beneficially employed to drive the generator itself and to supply other power needs of the user.

Actually, it should be pointed out that although the configuration of FIG. 1 augments the voltage of the commercial power source, additional power is extracted from the commercial power because the current of the series loop which passes through the commercial power is increased due to the increased (augmented) load voltage. For example, when the ac source is reduced by 10% from V to 0.9V, the ac source supplier expects his power drain to be reduced from $V^2/R$ to $0.81V^2/R$, where R is the load resistance. If everyone were to employ the configuration of FIG. 1, the load voltage is not reduced and therefore the load current is still V/R. Under these circumstances, the power extracted from the ac source is $0.9V^2/R$, which is greater than $0.81V^2/R$. This, of course, is not a problem for the ac source supplier, providing he knows about the universal use by his customers of the FIG. 1 augmenting system.

Figure 6:
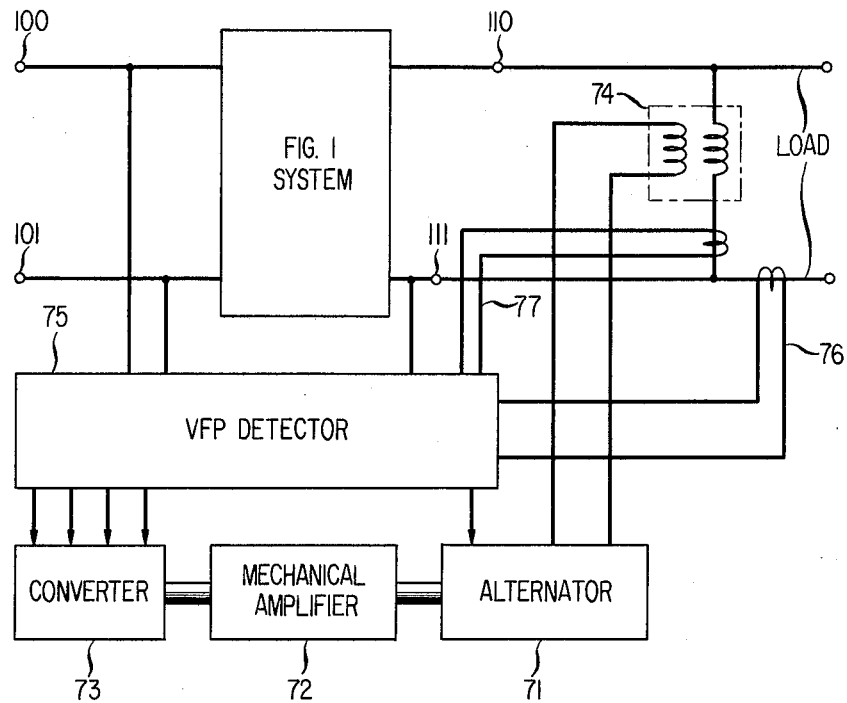
FIG. 6 depicts a block diagram of a voltage and current augmenting system embodying the principles of this invention.

A better solution may be had by constructing two independent augmenting systems, as depicted in FIG. 6. FIG. 6 comprises the system of FIG. 1 and an additional system including a VFP detector 75, a converter 73, a mechanical amplifier 72, an alternator 71 and a transformer 74. The various elements of the additional system are interconnected in identically the same manner as are the elements of the FIG. 1 system, with the exception that transformer 74 is interconnected between terminals 110 and 111 so as to augment the current of the ac source. By raising the voltage developed by alternator 71, the current supplied by alternator 71 is increased. The amount of current supplied by alternator 71 is controlled by VFP detector 75 which differs slightly in its internal design from VFP detector 40. By sensing the voltage $V_1$ of the ac source and the voltage V and current I of the load, the current desired to be supplied by alternator 71, $I_2$, is determined in detector 75 to be $(1 - V_1/V)I$. Since the voltage V is predetermined by the FIG. 1 system and may therefore be treated as a constant, the determination of the desired current $I_2$ reduces to $I_2 = (1-KV_1)I$, where K is the constant $1/V$. The current I is sensed in detector 75 with the aid of current sense loop 76, while the actual current provided by alternator 71 to the load is sensed with the aid of current sense loop 77. Conventional circuitry in detector 75, including an analog multiplier and a differential amplifier, determines the desired current $I_2$, compares it with the actual current supplied to the load by alternator 71, and controls alternator 71 appropriately.

The above described embodiments are representative of the principles of this invention. It is understood, however, that various modifications of, and variations from, the described embodiments may be introduced by skilled artisans practicing this invention without departing from the spirit and scope thereof. In indicated previously, for example, the gear ratios of gears 251-253 may be altered and the turns ratio of transformer 50 may be modified.

What is claimed is:

1. Apparatus for supplementing commercial power comprising:
    an alternator, driven by a main shaft, connected to supplement said commercial power;
    first means, responsive to said commercial power, for controlling the output of said alternator;
    second means, responsive to said commercial power and to said alternator, for determining the angular frequency and spatial phase angle of said main shaft; and
    third means, responsive to said second means, for driving said main shaft at said angular frequency and spatial phase angle.

2. The apparatus of claim 1 wherein said second means develops a phase voltage responsive to the phase angle by which said commercial power leads the power generated by said alternator, develops a frequency voltage synchronized to the frequency of said commercial power, and develops a magnitude-indicating voltage proportional to the difference between the RMS value of said commercial power and a preselected RMS power.

3. The apparatus of claim 2 wherein said frequency voltage is an oscillating voltage synchronized to the frequency of said commercial power.

4. The apparatus of claim 2 wherein said, third means comprises:
    a converter responsive to said phase voltage and said frequency voltage for rotating a control shaft at said angular frequency and spatial phase angle; and
    a mechanical amplifier, responsive to said control shaft, for driving said main shaft at said angular frequency and spatial phase angle.

5. The apparatus of claim 4 wherein said converter comprises:
    a synchronous motor responsive to said frequency voltage;
    a first differential interposed between said synchronous motor and said control shaft;
    a second motor responsive to said phase voltage; and
    a braking mechanism interposed between said second motor and said first differential.

6. The apparatus of claim 5 wherein said differential is a mechanical differential and said second motor is adapted for rotation in either direction of rotation.

7. The apparatus of claim 4 wherein said converter comprises:
    a three terminal first mechanical differential having a first terminal thereof coupled to said control shaft;
    a synchronous motor responsive to said frequency voltage connected to a second terminal of said differential;
    a mechanical brake; and
    a bidirectional motor coupled to said mechanical brake and to a third terminal of said first differential.

8. The apparatus of claim 4 wherein said mechanical amplifier comprises:
    a prime mover;
    first means for coupling said control shaft to said main shaft; and
    second means for coupling said prime mover to said main shaft.

9. The apparatus of claim 8
    wherein said first means comprises a gear arrangement for coupling, without loss, said angular frequency and spatial phase angle of said control shaft to said main shaft; and
    wherein said second means comprises fourth means for coupling the torque of said prime mover to said main shaft and fifth means for feeding-back the torque applied to said main shaft to said prime mover.

10. The apparatus of claim 4 wherein said mechanical amplifier comprises:
    a prime mover;
    a second three terminal mechanical differential;
    a third three terminal mechanical differential having a first terminal thereof connected to said main shaft;
    means for coupling said prime mover to a first terminal of said second differential;
    a gear arrangement connected to a second terminal of said second differential, to a second terminal of said third differential, and to said control shaft;
    sixth means for stalling a third terminal of said third differential;
    seventh means for measuring the torque applied by said means for stalling; and
    eighth means responsive to said seventh means for applying a torque to a third terminal of said second differential.

11. The apparatus of claim 10 wherein the torque applied by said eighth means is less than the torque measured by said seventh means.

12. The apparatus of claim 10 wherein the difference between the torque measured by said seventh means and the torque applied by said eighth means is δ, where δ is selectively small.

13. The apparatus of claim 10 wherein the difference between the torque measured by said seventh means and the torque applied by said eighth means is a preselected fraction of said torque measured by said seventh means.

14. The apparatus of claim 2 wherein said magnitude-indicating voltage is applied to said alternator to control the magnitude of the voltage developed by said alternator.

15. The apparatus of claim 1 wherein said alternator is connected to algebraically add a predetermined fraction of the voltage developed by said alternator to the voltage of said commercial power.

16. The apparatus of claim 15 wherein said predetermined fraction is controlled by a transformer interposed between said alternator and said commercial power.

17. The apparatus of claim 1 wherein said output voltage of said alternator is connected to a primary of a transformer and wherein the secondary of said transformer is serially connected to said commercial power.

18. A method for developing power to augment a commercial power source comprising the steps of
   connecting a power generating alternator to augment said commercial power source;
   sensing the frequency of said commercial power source;
   sensing the phase angle of said alternator in reference to the phase angle of said commercial power source;
   sensing the voltage level required of said alternator;
   controlling the field drive of said alternator in response to said step of sensing the voltage level; and
   controlling the angular frequency and spatial phase of said alternator in response to said steps of sensing the frequency and sensing the phase angle.

19. A system for providing power to a load in excess of the power delivered by a commercial power source, including an alternator and means for coupling the output voltage generated by said alternator to said commercial power source, characterized by:
   first means for detecting the frequency and voltage magnitude of said commercial power source and the phase angle of said commercial power source with respect to the phase angle of said voltage generated by said alternator;
   second means, responsive to said first means, for controlling the magnitude of said voltage generated by said alternator;
   third means, responsive to said first means, for rotating a control shaft at a angular frequency and spatial phase dictated by said first means; and
   mechanical amplifier means for transferring the rotation of said control shaft to said alternator and providing whatever torque is required by said alternator.

20. Apparatus for supplementing commercial power comprising:
   a first alternator, driven by a first main shaft, connected to supplement the voltage of said commercial power;
   first means, responsive to said commercial power, for controlling the output voltage of said first alternator;
   second means, responsive to said commercial power and to said first alternator, for determining the angular frequency and spatial phase angle of said first main shaft;
   third means, responsive to said second means, for driving said first main shaft at said angular frequency and spatial phase angle;
   a second alternator, driven by a second main shaft, connected to supplement the current of said commercial power;
   fourth means, responsive to said commercial power and to said second alternator, for determining the angular frequency and spatial phase angle of said second main shaft;
   fifth means, responsive to said fourth means, for driving said second main shaft at said angular frequency and spatial phase angle; and
   sixth means, responsive to said commercial power to said first and second alternators and to the load driven by said apparatus, for controlling the output current of said second alternator.

* * * * *